US012810816B2

(12) United States Patent
Choi et al.

(10) Patent No.: US 12,810,816 B2
(45) Date of Patent: Nov. 24, 2026

(54) DISPLAY DEVICE, DISPLAY PANEL, AND DISPLAY DRIVING METHOD

(71) Applicant: LG Display Co., Ltd., Seoul (KR)

(72) Inventors: SeungChan Choi, Paju-si (KR); JungHyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/240,746

(22) Filed: Jun. 17, 2025

(65) Prior Publication Data

US 2026/0188264 A1 Jul. 2, 2026

(30) Foreign Application Priority Data

Dec. 26, 2024 (KR) ........................ 10-2024-0197062

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/0809* (2013.01); *G09G 2310/08* (2013.01); *G09G 2330/021* (2013.01); *G09G 2330/028* (2013.01)

(58) Field of Classification Search
CPC ............... G09G 3/3291; G09G 3/3233; G09G 2300/0809; G09G 2310/08; G09G 2330/021; G09G 2330/028
See application file for complete search history.

(56) References Cited

U.S. PATENT DOCUMENTS

| | | | | |
|---|---|---|---|---|
| 2006/0250332 | A1* | 11/2006 | Lo | G09G 3/20 345/76 |
| 2018/0102090 | A1* | 4/2018 | Han | H10K 59/1213 |
| 2018/0342217 | A1 | 11/2018 | Kim et al. | |
| 2023/0009113 | A1* | 1/2023 | Son | G09G 3/3266 |

FOREIGN PATENT DOCUMENTS

| | | | |
|---|---|---|---|
| KR | 10-2280009 | B1 | 7/2021 |
| KR | 10-2334241 | B1 | 12/2021 |

* cited by examiner

*Primary Examiner* — Amit Chatly

(74) *Attorney, Agent, or Firm* — Morgan, Lewis & Bockius LLP

(57) ABSTRACT

Embodiments of the disclosure relate to a display device, a display panel, and a display driving method, and may provide a display device comprising a data driving circuit supplying a data voltage through a plurality of data channels, a display panel including a plurality of data lines disposed thereon to supply the data voltage to a plurality of subpixels, and including a multiplexing circuit connecting the plurality of data channels and the plurality of data lines, wherein the multiplexing circuit includes a first switching transistor and a second switching transistor connecting a first data channel and a first data line in parallel.

16 Claims, 10 Drawing Sheets

DISPLAY DEVICE, DISPLAY PANEL, AND DISPLAY DRIVING METHOD

CROSS-REFERENCE TO RELATED APPLICATION

This application claims the benefit of and priority to Korean Patent Application No. 10-2024-0197062, filed in the Republic of Korea on Dec. 26, 2024, the entirety of which is hereby incorporated by reference for all purposes as if fully set forth herein.

BACKGROUND

Technical Field

Embodiments of the disclosure relate to a display device, a display panel, and a display driving method and, more specifically, for example, without limitation, to a display device, a display panel, and a display driving method that can enhance the charging characteristic of a data voltage and enhance image quality.

Description of Related Art

As information technology develops, the market for display devices, which are user-to-information connecting media, is growing. Accordingly, various display devices, such as organic light emitting display (OLED), quantum dot display (QDD), liquid crystal display (LCD), and plasma display panel (PDP), are increasingly used.

Among these display devices, the organic light emitting display device uses self-emissive organic light emitting diodes, providing advantages, such as a fast response and better contrast ratio, luminous efficiency, luminance, and viewing angle.

The display device may include light emitting elements respectively arranged in a plurality of subpixels disposed on a display panel and cause the light emitting diodes to emit light by controlling the voltage applied to the light emitting elements, thereby displaying images while controlling the brightness of each subpixel.

The description provided in the background section should not be assumed to be prior art merely because it is mentioned in or associated with the background section. The background section may include information that describes one or more aspects of the subject technology.

SUMMARY

In the related art, by selectively supplying, to a data line of the display panel, the data voltage transferred from the data driving circuit through the data channel using a switching transistor in the display device, the number of data channels may be reduced, and thus a narrow bezel can be implemented.

However, it is newly recognized by the inventors of the present application that, as the driving time of the display panel increases, the characteristics of the transistor constituting the switching transistor may be deteriorated, thereby degrading the charging characteristic of the data voltage.

An aspect of the disclosure is to provide a display device, a display panel, and a display driving method capable of enhancing the charging characteristic of the data voltage and enhancing image quality.

Another aspect of the disclosure is to provide a display device, a display panel, and a display driving method capable of securing a recovery time and weakening the positive bias characteristic caused in the switching transistor constituting the subpixel due to deterioration or external light.

Yet another aspect of the disclosure is to provide a display device, a display panel, and a display driving method capable of low-power driving by enhancing the negative bias characteristic for the switching transistor formed of an oxide semiconductor.

Aspects of the disclosure are not limited to those set forth herein, and other unmentioned aspects would be apparent to one of ordinary skill in the art from the following description.

To achieve these and other aspects of the inventive concepts, as embodied and broadly described herein, embodiments of the disclosure may provide a display device comprising a data driving circuit supplying a data voltage through a plurality of data channels, a display panel including a plurality of data lines disposed thereon to supply the data voltage to a plurality of subpixels, and including a multiplexing circuit connecting the plurality of data channels and the plurality of data lines, wherein the multiplexing circuit includes a first switching transistor and a second switching transistor connecting a first data channel and a first data line in parallel.

In another aspect, embodiments of the disclosure may provide a display panel comprising a plurality of subpixels, a plurality of data lines supplying a data voltage to the plurality of subpixels, and a multiplexing circuit connecting a plurality of data channels and the plurality of data lines, the multiplexing circuit including a first switching transistor and a second switching transistor connecting a first data channel, among the plurality of data channels, and a first data line, among the plurality of data lines, in parallel.

In yet another aspect, embodiments of the disclosure may provide a method for driving a display device comprising a plurality of subpixels, a plurality of data lines supplying a data voltage to the plurality of subpixels, and a multiplexing circuit connecting a plurality of data channels and the plurality of data lines, the multiplexing circuit including a first switching transistor and a second switching transistor connecting a first data channel among the plurality of data channels and a first data line among the plurality of data lines in parallel. The method may comprise generating a turn-on signal swinging between a high level and a low level according to a turn-on control signal, outputting the turn-on signal by a switching control signal, and outputting a turn-off signal by the switching control signal, wherein while the turn-on signal is applied to the first switching transistor, the turn-off signal may be applied to the second switching transistor.

According to embodiments of the disclosure, there may be provided a display device, a display panel, and a display driving method capable of enhancing the charging characteristic of the data voltage and enhancing image quality.

According to embodiments of the disclosure, there may be provided a display device, a display panel, and a display driving method capable of enhancing the charging characteristic of the data voltage by securing a recovery time and weakening the positive bias characteristic of the switching transistor constituting the subpixel.

According to embodiments of the disclosure, there may be provided a display device, a display panel, and a display driving method capable of low-power driving by enhancing the negative bias characteristic for the switching transistor formed of an oxide semiconductor.

The effects of the disclosure are not limited to the foregoing aspects, and other effects will be apparent to one of ordinary skill in the art from the following detailed description.

It is to be understood that both the foregoing general description and the following detailed description of the present disclosure are by way of example and are intended to provide further explanation of the inventive concepts as claimed.

BRIEF DESCRIPTION OF DRAWINGS

The disclosure will be more fully understood from the following detailed description and the accompanying drawings, which are provided for illustration only and are not intended to limit the disclosure.

The accompanying drawings, that are included to provide a further understanding of the disclosure and are incorporated in and constitute a part of the disclosure, illustrate example embodiments of the disclosure and together with the description serve to explain various principles of the disclosure. In the drawings.

Figure 1:
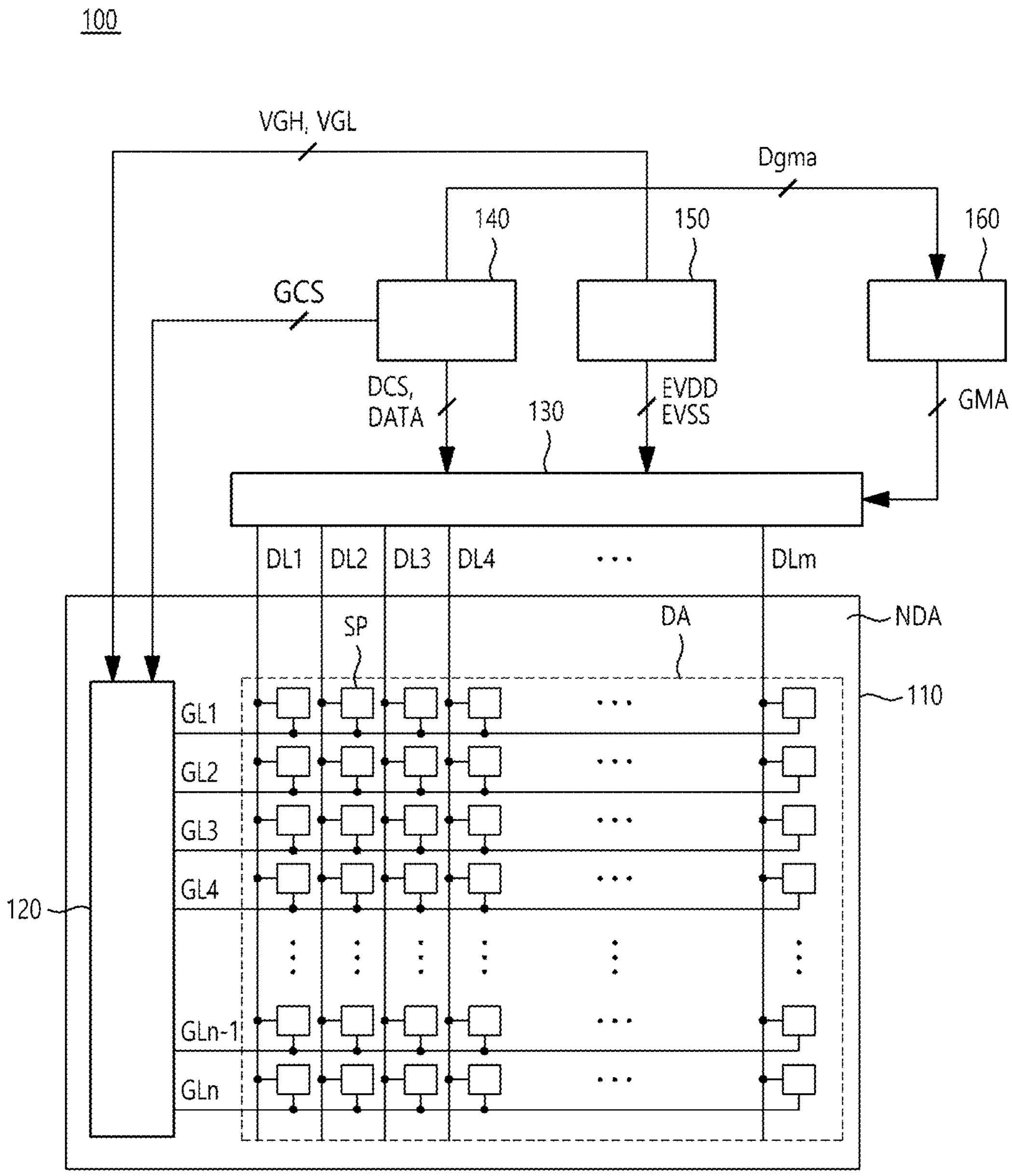
FIG. 1 is a view schematically illustrating a display device according to example embodiments of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Hereinafter, some example embodiments of the disclosure will be described in detail with reference to the accompanying drawings.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein may be omitted where the description may make the subject matter in some embodiments of the disclosure rather unclear.

The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the protected scope of the present disclosure may be defined by scopes of claims and their equivalents. Any implementation described herein as an "example" is not necessarily to be construed as preferred or advantageous over other implementations.

The shapes, sizes, ratios, angles, numbers, and the like, which are illustrated in the drawings to describe various example embodiments of the present disclosure are merely given by way of example. Therefore, the present disclosure is not limited to the illustrations in the drawings. The same or similar elements are designated by the same reference numerals throughout the specification unless otherwise specified. In the following description where the detailed description of the relevant known function or configuration may unnecessarily obscure an important point of the present disclosure, a detailed description of such known function of configuration may be omitted.

Where a term like "include," "have," "contain," "constitute," "make up of," or "formed of" is used, one or more other elements may be added unless the term is used with a more limiting term, such as "only." An element described in a singular form may include a plurality of elements, and vice versa, unless the context clearly indicates otherwise.

Although terms "first," "second," "A," "B," "(A)," "(B)," and the like may be used herein to describe various elements, these elements should not be interpreted to be limited by these terms as they are not used to define a particular essence, order, sequence, precedence, or number of such elements. These terms are used merely to refer to one element separately from another. For example, a first element could be termed a second element, and a second element could similarly be termed a first element, without departing from the scope of the present disclosure.

When it is mentioned that a first element "is connected or coupled to", "contacts or overlaps" a second element, or the like, it should be interpreted that, not only can the first element "be directly connected or coupled to" or "directly contact or overlap" the second element, but a third element can also be "interposed" between the first and second elements, or the first and second elements can "be connected or coupled to" or "contact or overlap" each other via a fourth element. Here, the second element may be included in at least one of two or more elements that "are connected or coupled to" or "contact or overlap" each other.

Where time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless a more limiting term, such as "directly" or "immediately," is used together.

Where positional relationships are described, for example, where the positional relationship between two parts is described using "on," "over," "under," "above," "below," "beneath," "near," "close to," or "adjacent to," "beside," "next to," or the like, one or more other parts may be disposed between the two parts unless a more limiting term, such as "immediate(ly)," "direct(ly)," or "close(ly)" is used. For example, where a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

In addition, where any dimensions, relative sizes, and the like are described, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Features of various embodiments of the present disclosure may be partially or entirely coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It should be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, various example embodiments of the disclosure will be described in detail with reference to the accompanying drawings. All the components of each display panel and each display device including the same according to all embodiments of the present disclosure may operatively be coupled and configured.

FIG. 1 is a view schematically illustrating a display device according to example embodiments of the disclosure.

As shown in FIG. 1, a display device 100 according to example embodiments of the disclosure may include a display panel 110, a gate driving circuit 120, a data driving circuit 130, a timing controller 140, a power management circuit 150, and a gamma circuit 160, but the present disclosure is not limited thereto, and more or less components may be included in the display device 100.

The display panel 110 displays an image using a plurality of subpixels SP. A plurality of data lines DL1 to DLm and a plurality of gate lines GL1 to GLn may be formed on the display panel 110.

The plurality of subpixels SP may be formed in an area where the plurality of data lines DL1 to DLm and the plurality of gate lines GL1 to GLn cross each other. Each of the subpixels SP may be connected to the data line DL and the gate line GL.

A black matrix, a color filter, or the like may be formed on an upper portion of the display panel 110. The color filter may be formed in an opening not covered by the black matrix. For example, the color filter and the black matrix may be alternately arranged in a horizontal direction or vertical direction of the display panel.

When the display panel 110 is formed in a color filter on TFT (COT) structure, the black matrix and the color filter may be formed under the display panel 110.

The gate driving circuit 120 receives a gate control signal GCS from the timing controller 140, and receives a gate high voltage VGH and a gate low voltage VGL from the power management circuit 150. The gate driving circuit 120 generates a gate signal that swings from the gate low voltage VGL to the gate high voltage VGH according to the gate control signal GCS and supplies the same to the gate lines GL1 to GLn.

The gate driving circuit 120 may be disposed in the non-display area NDA of the display panel 110 in a gate-in-panel (GIP) manner, but the present disclosure is not limited thereto. For example, the gate driving circuit 120 may be disposed in the display area DA of the display panel 110 in a gate-in-active (GIA) manner.

The gate driving circuit 120 may include a plurality of gate driving integrated circuits GDIC, and a plurality of gate driving integrated circuits may be connected to the plurality of gate lines GL1 to GLn.

The data driving circuit 130 receives a digital data signal DATA and a digital data control signal DCS from the timing controller 140. The data driving circuit 130 receives a high-potential driving voltage EVDD and a low-potential driving voltage EVSS from the power management circuit 150. The data driving circuit 130 receives a gamma reference voltage GMA from the gamma circuit 160.

The gamma circuit 160 may receive the gamma reference voltage data Dgma from the timing controller 140 and generate the gamma reference voltage GMA according to the gamma reference voltage data Dgma.

The timing controller 140 receives a data signal DATA and a timing signal from an external host system (not illustrated). The timing signal may include a vertical synchronization signal, a horizontal synchronization signal, a data enable signal, and a clock signal, but the present disclosure is not limited thereto.

The timing controller 140 generates a gate control signal GCS for controlling the operation timing of the gate driving circuit 120 and generates a data control signal DCS for controlling the operation timing of the data driving circuit 130 based on a timing signal and timing information stored in a memory such as an electrically erasable programmable read-only memory (EPROM) or signals transferred from the external host system.

The power management circuit 150 generates and supplies a driving voltage for the operation of the gate driving circuit 120, the data driving circuit 130, and the timing controller 140. The power management circuit 150 supplies a gate high voltage VGH and a gate low voltage VGL to the gate driving circuit 120. The gate high voltage VGH may be set to a voltage level capable of turning on the transistor constituting the subpixel SP of the display panel 110, and the gate low voltage VGL may be set to a voltage capable of turning off the transistor constituting the subpixel SP of the display panel 110.

The power management circuit 150 supplies the high-potential driving voltage EVDD and the low-potential driving voltage EVSS to the data driving circuit 130.

The display device 100 according to embodiments of the disclosure may be a self-luminous display device where self-luminous elements capable of emitting light are disposed on the display panel 110, such as an organic light emitting display device, a quantum dot display device, a micro LED display device, or the like, but the present disclosure is not limited thereto.

Figure 2:
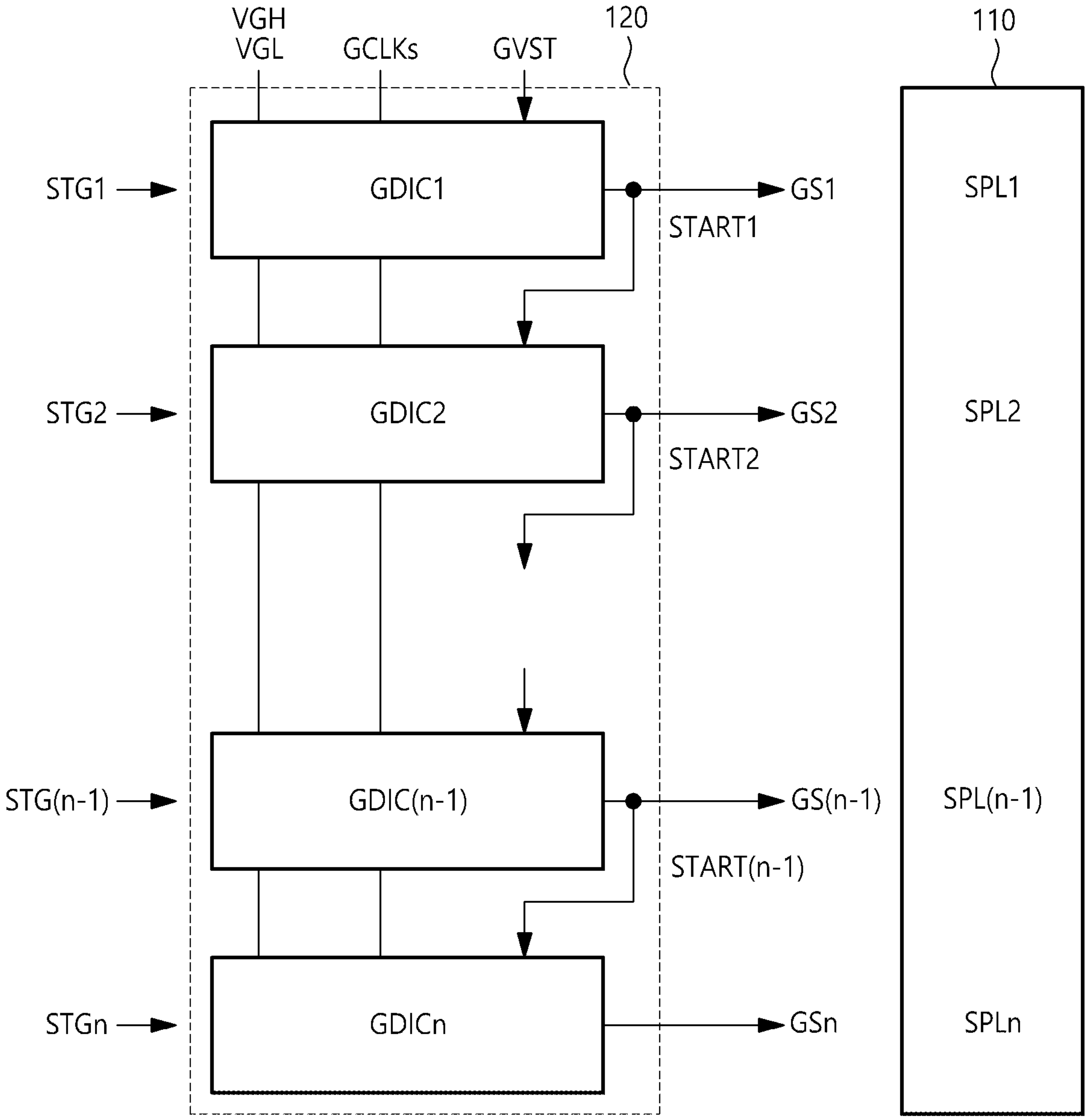
FIG. 2 is a block diagram illustrating an example of a configuration of a gate driving circuit according to example embodiments of the disclosure.

FIG. 2 is a block diagram illustrating an example of a configuration of a gate driving circuit according to embodiments of the disclosure.

As shown in FIG. 2, in the display device 100 according to example embodiments of the disclosure, the gate driving circuit 120 may be disposed in the non-display area NDA of the display panel 110 or in the display area DA.

The gate driving circuit 120 may include n stages STG1 to STGn where n (which is a natural number of 2 or more) gate driving integrated circuits GDIC1 to GDICn are connected in cascade.

The gate driving integrated circuits GDIC1 to GDICn each receive a gate high voltage VGH and a gate low voltage VGL as driving voltages, and are operated by gate clock signals GCLKs.

The first gate driving integrated circuit GDIC1 starts operating by the gate start signal GVST, and the second gate driving integrated circuit GDIC2 to the nth gate driving integrated circuit GDICn may receive gate signals GS1 to GS(n−1) output through the output terminals of the previous stages, as start signals.

For example, the first gate signal GS1 output from the output terminal of the first gate driving integrated circuit GDIC1 corresponding to the first stage STG1 may be applied to the start signal input terminal of the second gate driving integrated circuit GDIC2 of the second stage STG2 and the first subpixel line SPL1 of the display panel 110 disposed in the first row. For example, gate signals GS2 to GS(n) output through the output terminals of the second to nth gate driving integrated circuits GDIC2 to GDICn may be applied to the second subpixel line SPL2 to the nth subpixel line SPLn of the display panel 110 disposed in the second to nth rows respectively.

Therefore, the first gate driving integrated circuit GDIC1 of the first stage STG1 uses the gate start signal GVST as a start signal but, from the second gate driving integrated circuit GDIC2 of the second stage STG2, the first gate signal GS1 output from the output terminal of the first gate driving integrated circuit GDIC1 positioned at the previous stage may be used as a start signal. Similarly, for the kth gate driving integrated circuit GDICk of the kth stage STGk (where k is equal to or lager than 2), the (k−1)th gate signal GS(k−1) output from the output terminal of the (k−1)th gate driving integrated circuit GDIC(k−1) positioned at the previous stage may be used as a start signal.

Here, the first gate signal GS1 output from the output terminal of the first gate driving integrated circuit GDIC1 is represented as the first start signal START1 to show that the first gate signal GS1 generated at the first stage STG1 is used as the start signal of the next stage. The start signal described in the present disclosure may also be referred to as a carry signal, but the present disclosure is not limited thereto.

As identified from the relationship between the (n−1)th stage STG(n−1) and the nth stage STGn, the stages connected in cascade and the configuration using the gate signal of the previous stage as the start signal of the next stage may be equally applied to all of the stages STG1 to STGn.

The gate signal output from one stage (one gate driving integrated circuit) may include one or more scan signals and one or more light emission signals. For example, two scan signals and one light emission signal may be output from one stage (one gate driving integrated circuit).

Figure 3:
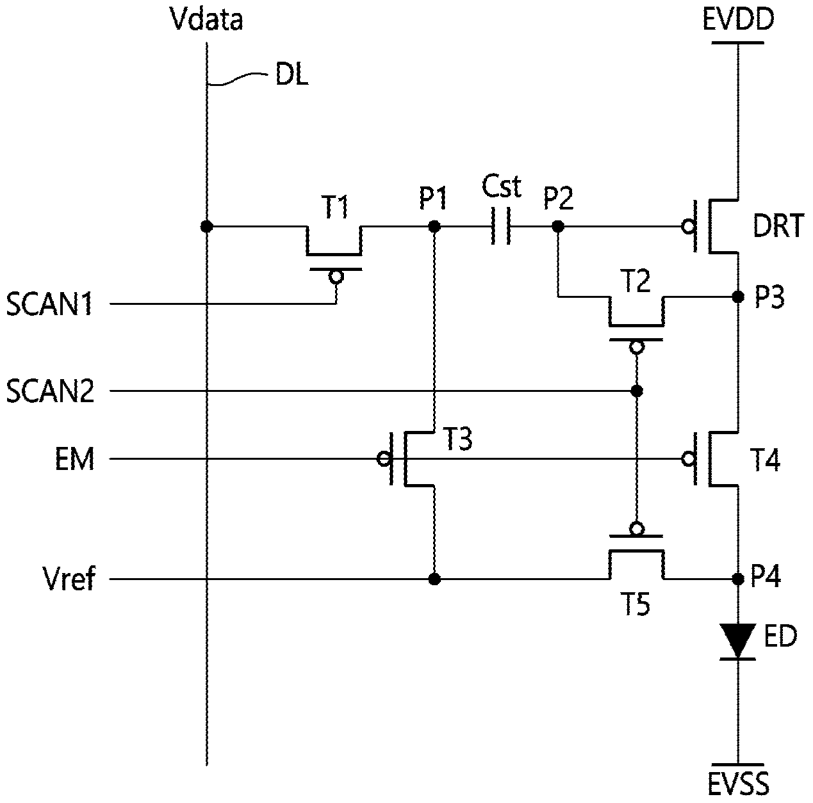
FIG. 3 is a view illustrating an example of a subpixel circuit of a display device according to example embodiments of the disclosure.

FIG. 3 is a view illustrating an example of a subpixel circuit of a display device according to example embodiments of the disclosure.

As shown in FIG. 3, the subpixel circuit of the display device 100 according to embodiments of the disclosure may include a light emitting element ED, a driving transistor DRT, a plurality of switching transistors T1 to T5, and a storage capacitor Cst.

The driving transistor DRT and the plurality of switching transistors T1 to T5 included in the subpixel circuit may be implemented as PMOS type low temperature poly silicon (LTPS) transistors, thereby securing a desired response characteristic.

Alternatively, at least one of the plurality of switching transistors T1 to T5 may be implemented as an NMOS type or a PMOS type oxide transistor having good leakage current characteristics when turned off, and the remaining switching transistors may be implemented as PMOS type LTPS transistors having good response characteristics. However, the type and/or material of each of the driving transistor DRT and the plurality of switching transistors T1 to T5 described herein may be provided by way of example only, and the present disclosure is not limited thereto.

Here, the circle at the gate electrode of the transistor constituting the subpixel circuit is shown as an example for the purpose of describing an NMOS or PMOS transistor, but does not limit the transistor to either an NMOS or PMOS transistor.

Further, the driving transistor DRT constituting the subpixel circuit may be formed of an oxide transistor having excellent leakage current characteristics.

In this case, the oxide transistor formed of the oxide semiconductor may be a transistor having a channel or active layer formed from an oxide semiconductor, such as indium, gallium, zinc oxide, IGZO or IGZTO. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The light emitting element ED emits light by a driving current adjusted according to the gate-source voltage of the driving transistor DRT. The anode electrode of the light emitting element ED is connected to the fourth node P4, and the cathode electrode of the light emitting element ED is connected to the low-potential driving voltage EVSS.

When the light emission device ED is an organic light emission diode, an organic compound layer is provided between the anode electrode and the cathode electrode.

The organic compound layer may include a hole injection layer HIL, a hole transport layer HTL, an emission layer EML, an electron transport layer ETL, and an electron injection layer EIL. For example, two or more organic compound layers emitting different colors of light may be stacked according to a tandem structure.

When a driving current flows through the light emission device ED, holes passing through the hole transport layer and electrons passing through the electron transport layer move into the light emitting layer and are combined to form excitons, and as a result, the light emitting layer may emit visible light of various wavelengths.

The driving transistor DRT controls a current flowing through the light emitting element ED according to the gate-source voltage. The gate electrode of the driving transistor DRT is connected to the second node P2, the drain electrode (or source electrode) is connected to a driving voltage line supplying the high-potential driving voltage EVDD, and the source electrode (or drain electrode) is connected to the third node P3.

The subpixel circuit may include a first switching transistor T1 to a fifth switching transistor T5 capable of sampling the gate-source voltage and a storage capacitor Cst to compensate for the threshold voltage or mobility variation of the driving transistor DRT.

The first switching transistor T1 is connected between the data line DL and the first node P1, and is switched according to the first scan signal SCAN1. The gate electrode of the first switching transistor T1 is connected to the first gate line to which the first scan signal SCAN1 is applied, the drain electrode (or source electrode) is connected to the data line DL, and the source electrode (or drain electrode) is connected to the first node P1.

The second switching transistor T2 is connected between the second node P2 and the third node P3, and is switched according to the second scan signal SCAN2. The gate electrode of the second switching transistor T2 is connected to the second gate line to which the second scan signal SCAN2 is applied, the drain electrode (or source electrode) is connected to the third node P3, and the source electrode (or drain electrode) is connected to the second node P2.

Since one electrode of the second switching transistor T2 is connected to the gate electrode of the driving transistor DRT, it is preferable that the second switching transistor T2 has good Off current characteristics. Accordingly, the second switching transistor T2 may be designed in a dual gate structure to suppress leakage current when turned off.

The third switching transistor T3 is connected between the first node P1 and the reference voltage line to which the reference voltage Vref is applied, and is switched according to the light emission signal EM. The gate electrode of the third switching transistor T3 is connected to the third gate line to which the light emission signal EM is applied, the drain electrode (or source electrode) is connected to the first node P1, and the source electrode (or drain electrode) is connected to the reference voltage line.

The fourth switching transistor T4 is connected between the third node P3 and the fourth node P4, which is the anode electrode of the light emitting element ED, and is switched according to the light emission signal EM. The gate electrode of the fourth switching transistor T4 is connected to the third gate line to which the light emission signal EM is applied, the drain electrode (or source electrode) is connected to the third node P3, and the source electrode (or drain electrode) is connected to the fourth node P4. Since the fourth switching transistor T4 controls the driving current flowing through the light emitting element ED, it may be referred to as a light emission control transistor.

The fifth switching transistor T5 is connected between the fourth node P4 and the reference voltage line, and is switched according to the second scan signal SCAN2. The gate electrode of the fifth switching transistor T5 is connected to the second gate line to which the second scan signal SCAN2 is applied, the drain electrode (or source electrode) is connected to the fourth node P4, and the source electrode (or drain electrode) is connected to the reference voltage line.

The storage capacitor Cst is connected between the first node P1 and the second node P2.

It is to be noted that, although each of the plurality of subpixels may have a 5T1C structure shown in FIG. 3, but is not limited thereto, and may include more or less elements than shown. For example, 3T1C, 4T1C, 3T2C, 4T2C, 5T2C, 6T2C, 7T1C, 7T2C, 8T1C, 8T2C structures, etc. are also possible. And more or less transistors and capacitors could be included.

In this case, in the display device 100 according to the disclosure, a plurality of switching transistors are connected to one data channel that transfers the data voltage in the data driving circuit 130, and the data line for supplying data voltage is selected through the plurality of switching transistors, thereby reducing the number of data channels and implementing a narrow bezel. Such the plurality of switching transistors may be collectively referred to as a switching circuit, data switch circuit or a multiplexing circuit, but the present disclosure is not limited thereto.

However, as the driving time of the display panel 110 increases, the characteristics of the switching transistor connecting the data channel and the data line deteriorate, which may degrade the charging characteristics of the data voltage.

In the display device 100 according to the disclosure, a multiplexing circuit where a plurality of switching transistors are connected to one data line is formed, and the plurality of switching transistors are alternately driven, enhancing the charging characteristics of the data voltage.

Figure 4:
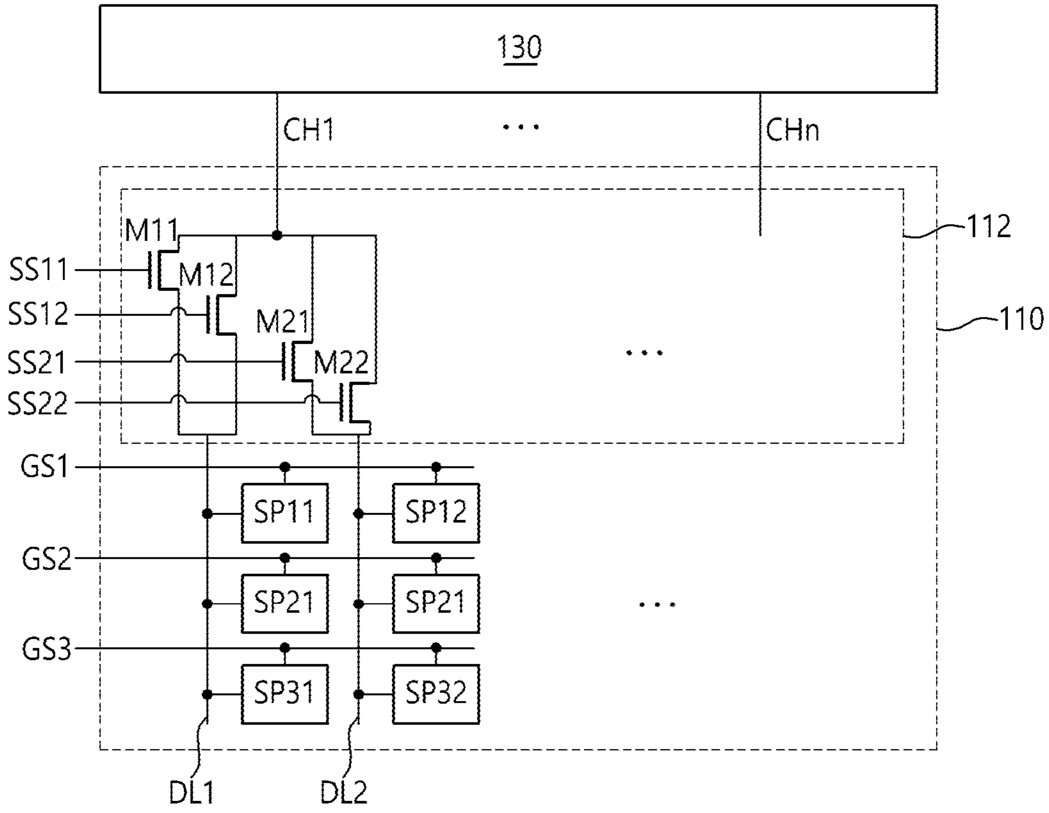
FIG. 4 is a view illustrating an example structure of a switching circuit connecting a data channel and a data line in a display device according to example embodiments of the disclosure.

FIG. 4 is a view illustrating an example of a structure of a switching circuit connecting a data channel and a data line in a display device according to embodiments of the disclosure.

As shown in FIG. 4, in the display device 100 according to example embodiments of the disclosure, the data driving circuit 130 sequentially latches the image data DATA input from the timing controller 140 line by line.

Further, the latched line-by-line image data DATA is converted into a data voltage Vdata using a gamma voltage and a digital-to-analog converter, and is output through the plurality of data channels CH1 to CHn according to the source output enable signal.

The multiplexing circuit 112 may include a plurality of switching transistors (e.g., M11, M12, M21, and M22) connecting one data channel (e.g., CH1) and a plurality of data lines (e.g., DL1 and DL2). The first data line DL1 may be connected to the subpixels SP11, SP21, SP31, . . . disposed in the first column, and the second data line DL2 may be connected to the subpixels SP12, SP22, SP32, . . . disposed in the second column.

Here, an example where the first data channel CH1 is connected to the first data line DL1 and the second data line DL2 by the multiplexing circuit 112 is described. However, the present disclosure is not limited thereto, and each data channel may be connected to three or more data line by the multiplexing circuit.

In this case, the plurality of switching transistors M11, M12, M21, and M22 constituting the multiplexing circuit 112 may be switching elements formed of transistors. In particular, the plurality of switching transistors M11, M12, M21, and M22 constituting the multiplexing circuit 112 may be formed of an oxide semiconductor material having excellent mobility characteristics.

Further, in the display device 100 according to the disclosure, the plurality of switching transistors M11 and M12 may be connected between the first data channel CH1 and the first data line DL1 in the multiplexing circuit 112. In this case, the plurality of switching transistors M11 and M12 connected to the first data line DL1 may be alternately driven to prevent or reduce deterioration of data charging characteristics.

The data voltage Vdata transferred through the data channel CH1 according to the switching signals SS11, SS12, SS21, and SS22 output from the timing controller 140 may be selectively supplied to the data lines DL1 and DL2 of the display panel 110 under the control of multiplexing circuit 112.

For example, when the plurality of switching transistors M11, M12, M21, and M22 constituting the multiplexing circuit 112 are N-type metal oxide semiconductor (MOS) transistors, the plurality of switching transistors M11, M12, M21, and M22 may be turned on by high-level switching signals SS1, SS2, and SS3, and supply the data voltage transferred through the data channels CH1 and CH2 through the selected data lines DL1 and DL2.

For example, when the eleventh switching signal SS11 connected to the eleventh switching transistor M11 is a turn-on signal or the twelfth switching signal SS12 connected to the twelfth switching transistor M12 is a turn-on signal, the data voltage supplied through the first data channel CH1 may be supplied to the first data line DL1. In this case, when the eleventh switching signal SS11 is a turn-on signal, the twelfth switching signal SS12 may be a turn-off signal, and on the contrary, when the eleventh switching signal SS11 is a turn-off signal, the twelfth switching signal SS12 may be a turn-on signal.

Further, when the 21st switching signal SS21 connected to the 21st switching transistor M21 is a turn-on signal or the 22nd switching signal SS22 connected to the 22nd switching transistor M22 is a turn-on signal, the data voltage supplied through the first data channel CH1 may be supplied to the second data line DL2. In this case, when the 21st switching signal SS21 is a turn-on signal, the 22nd switching signal SS22 may be a turn-off signal, and on the contrary, when the 21st switching signal SS21 is a turn-off signal, the 22nd switching signal SS22 may be a turn-on signal.

Described here is an example where the data voltage transferred through one data channel (e.g., CH1) is supplied to two data lines (e.g., DL1 and DL2) by the multiplexing circuit 112. However, the multiplexing circuit 112 is not limited thereto, and may be configured so that the data voltage output from one data channel is supplied to three or more data lines.

The multiplexing circuit 112 may be formed in the non-display area NDA of the display panel 110, but the present disclosure is not limited thereto.

Figure 5:
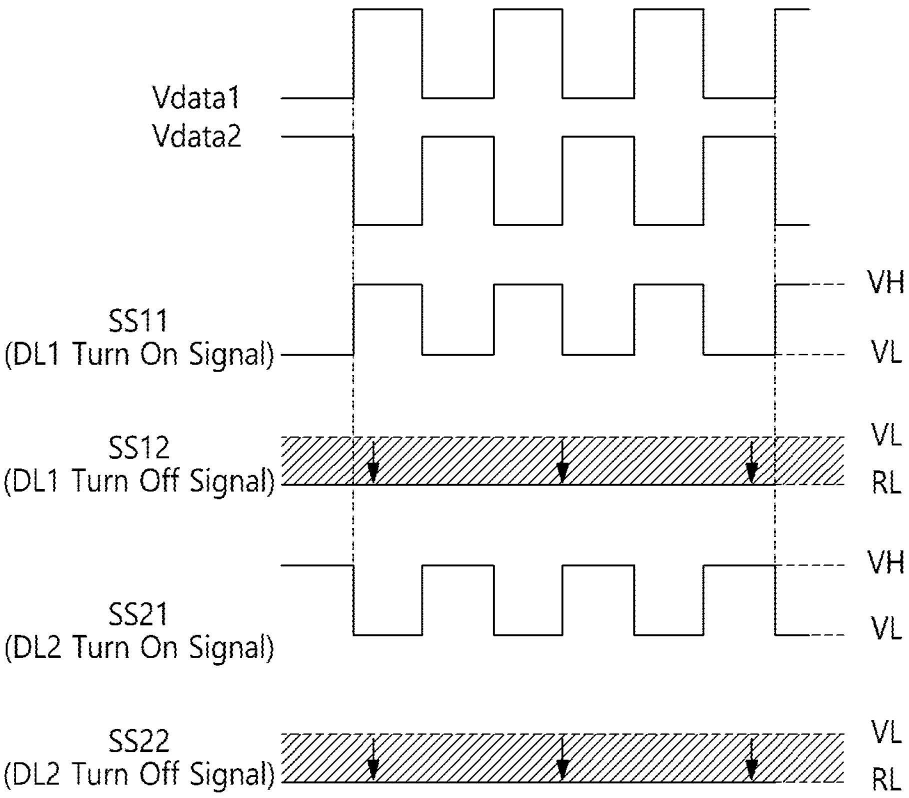
FIG. 5 is a signal waveform diagram illustrating an example operation of a multiplexing circuit connecting one data channel and two data lines in a display device according to example embodiments of the disclosure.

FIG. 5 is a signal waveform diagram illustrating an example of an operation of a multiplexing circuit connecting one data channel and two data lines in a display device according to example embodiments of the disclosure.

As shown in FIG. 5, in the display device 100 according to embodiments of the disclosure, the multiplexing circuit 112 may connect the first data channel CH1 with the first data line DL1 and the second data line DL2.

In this case, the eleventh switching transistor M11 and the twelfth switching transistor M12 may be connected in parallel between the first data channel CH1 and the first data line DL1. In this case, the eleventh switching transistor M11 and the twelfth switching transistor M12 connected to the first data line DL1 may be alternately driven to prevent or reduce deterioration of data charging characteristics.

Further, the 21st switching transistor M21 and the 22nd switching transistor M22 may be connected in parallel between the first data channel CH1 and the second data line DL2. In this case, the 21st switching transistor M21 and the 22nd switching transistor M22 connected to the second data line DL2 may be alternately driven to prevent or reduce deterioration of data charging characteristics.

For example, the eleventh switching signal SS11 controlling the eleventh switching transistor M11 may be applied as the turn-on signal of the first data line DL1, and the twelfth switching signal SS12 controlling the twelfth switching transistor M12 may be applied as the turn-off signal of the first data line DL1.

In this case, the eleventh switching signal SS11 corresponding to the turn-on signal of the first data line DL1 may have an AC signal waveform synchronized with the first data voltage Vdata1 applied to the first data line DL1. Thus, the eleventh switching signal SS11 corresponding to the turn-on signal maintains the high level VH of turning on the eleventh switching transistor M!1 during the period when the first data voltage Vdata1 is applied, and maintains the low level VL of turning off the eleventh switching transistor M11 while the first data voltage Vdata1 is not applied.

In addition, while the eleventh switching signal SS11 is applied as the turn-on signal, the twelfth switching signal SS12 corresponding to the turn-off signal may be applied to the twelfth switching transistor M12. In this case, the twelfth switching signal SS12 for turning off the twelfth switching transistor M12 may have the same level as the low level VL of the eleventh switching signal S11, but may maintain a recovery level RL for weakening deterioration of the bias characteristic while the twelfth switching transistor M12 is turned off.

For example, the high level VH of the switching signal may be a positive level of 9V or higher, the low level VL of the switching signal may be a positive level of 1V or less, and the recovery level RL may be a negative level, but the present disclosure is not limited thereto.

In addition, the 21st switching signal SS21 controlling the 21st switching transistor M21 may be applied as the turn-on signal of the second data line DL2, and the 22nd switching signal SS22 controlling the 22nd switching transistor M22 may be applied as the turn-off signal of the second data line DL2.

In this case, it may be expressed that the switching transistors (e.g., M11 and M21) transferring the data voltage to the data line are turn-on driven by the turn-on signal, and the switching transistors (e.g., M12 and M22) maintaining the turn-off state by the turn-off signal are turn-off driven (or recovery driving).

The eleventh switching signal SS11 corresponding to the turn-on signal of the first data line DL1 and the 21st switching signal SS21 corresponding to the turn-on signal of the second data line DL2 may be signals having opposite phases.

In other words, the 21st switching signal SS21 corresponding to the turn-on signal of the second data line DL2 may have an AC signal waveform synchronized with the second data voltage Vdata2 applied to the second data line DL2. Therefore, the 21st switching signal SS21 corresponding to the turn-on signal of the second data line DL2 maintains the high level VH of turning on the 21st switching transistor M21 during the period where the second data voltage Vdata2 is applied, and maintains the low level VL of turning off the 21st switching transistor M21 while the second data voltage Vdata2 is not applied.

While the 21st switching signal SS21 is applied as the turn-on signal, the 22nd switching signal SS22 corresponding to the turn-off signal may be applied to the 22nd switching transistor M22. In this case, the 22nd switching signal SS22 for turning off the 22nd switching transistor M22 may have the same level as the low level VL of the 21st switching signal S21, but may maintain the recovery level RL for reducing deterioration of bias characteristics while the 22nd switching transistor M22 is turned off.

The switching transistors M11, M12, M21, and M22 formed of oxide semiconductors may deteriorate as the driving time increases, increasing the positive bias temperature stress (PBTS) where the threshold voltage shifts in the positive direction.

Further, when external light enters the subpixel SP, the PBTS may further increase due to external light incident on the active layer of the switching transistors M11, M12, M21, and M22.

However, since the display device 100 of the disclosure alternately drives the plurality of switching transistors M11 and M12 connecting the first data channel CH1 and the first data line DL1, the PBTS phenomenon where the threshold voltage increases in the positive direction may be mitigated by reducing the driving time of the switching transistors M11 and M12.

Further, the display device 100 of the disclosure may enhance the negative bias temperature illumination stress (NBTiS) characteristic where the threshold voltage of the twelfth switching transistor M12 shifts in the negative direction by maintaining a lower recovery level RL than the low level voltage VL of the turn-on signal while the twelfth switching transistor M12 is turned off. Thus, during a period where the twelfth switching transistor M12 is turned off, the positive bias temperature stress (PBTS) occurred on the twelfth switching transistor M12 can be mitigated, cancelled or compensated.

Accordingly, the negative bias characteristic where the threshold voltage shifts in the negative direction may be enhanced for transistors that are turned off during the light emission interval.

As a result, the positive bias characteristic (PBTS) of the switching transistors M11 and M12 connecting the first data channel CH1 and the first data line DL1 may be decreased, thereby reducing deterioration of the charging characteristic of the data voltage flowing through the data line.

This phenomenon may appear more effectively when a switching transistor is formed of an oxide semiconductor having excellent mobility characteristics.

Further, the display device 100 according to the disclosure may weaken the positive bias characteristics and secure a recovery time by alternately applying turn-on and turn-off signals to the plurality of switching transistors (e.g., M11 and M12) connected between the data channel (e.g., CH1) and the data line (e.g., DL1).

Figure 6:
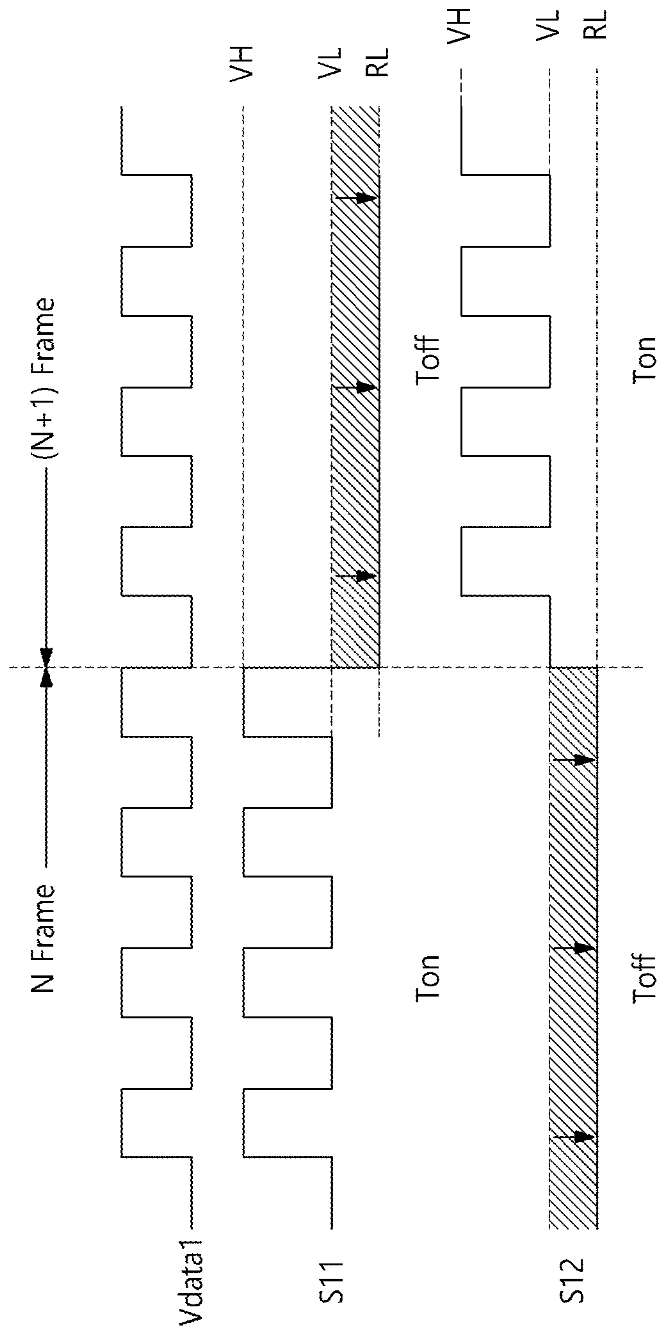
FIG. 6 is a signal waveform diagram illustrating an example of alternately driving a plurality of switching transistors connecting a data channel and a data line in a display device according to example embodiments of the disclosure.

FIG. 6 is a signal waveform diagram illustrating an example of alternately driving a plurality of switching transistors connecting a data channel and a data line in a display device according to example embodiments of the disclosure.

As shown in FIG. 6, in the display device 100 according to embodiments of the disclosure, the multiplexing circuit 112 may include an eleventh switching transistor M11 and a twelfth switching transistor M12 connected in parallel between the first data channel CH1 and the first data line DL1.

In this case, the eleventh switching transistor M11 and the twelfth switching transistor M12 may be alternately driven to reduce the influence of positive bias characteristics.

For example, the eleventh switching signal SS11 that controls the eleventh switching transistor M11 during N frames may be applied as a turn-on signal, and the twelfth switching signal SS12 that controls the twelfth switching transistor M12 may be applied as a turn-off signal. In this case, in the eleventh switching signal SS11, the N-frame interval corresponds to the turn-on interval Ton. On the other hand, in the twelfth switching signal SS12, the N-frame interval corresponds to the turn-off interval Toff.

The eleventh switching signal SS11 is synchronized with the first data voltage Vdata1 during the turn-on interval Ton, and maintains a high level VH at which the eleventh switching transistor M11 is turned on while the first data voltage Vdata1 is applied, and maintains a low level VL at which the eleventh switching transistor M11 is turned off while the first data voltage Vdata1 is not applied.

On the other hand, the twelfth switching signal SS12 corresponding to the turn-off signal may be applied to the twelfth switching transistor M12 during the N-frame interval. Therefore, the N-frame interval of the twelfth switching signal SS12 corresponds to the turn-off interval Toff.

In this case, the twelfth switching signal SS12 may be applied as a DC signal having a level of turning off the twelfth switching transistor M12 during the turn-off interval Toff. The twelfth switching signal S12 may have the same level as the low level of the eleventh switching signal SS11, but may also maintain the recovery level RL capable of enhancing negative bias characteristics of the twelfth switching transistor M12.

In addition, during (N+1) frame, the eleventh switching signal SS11 controlling the eleventh switching transistor M11 may be applied as a turn-off signal, and the twelfth switching signal SS12 controlling the twelfth switching transistor M12 may be applied as a turn-on signal. In this case, the eleventh switching signal SS11 may have an (N+1) frame interval corresponding to the turn-off interval Toff, and the twelfth switching signal SS12 may have an (N+1) frame interval corresponding to the turn-on interval Ton.

Although an example has been described in which the turn-on interval Ton and the turn-off interval Toff of the switching transistors M11 and MQ12 constituting the multiplexing circuit 112 are alternated every frame, the turn-on interval Ton and the turn-off interval Toff of the switching transistors M11 and MQ12 may be alternated every period of one frame or more, such as every two frames, every 60 frames, or every 120 frames.

As a result, the display device 100 according to the disclosure may weaken positive bias characteristics and enhance data charging characteristics by securing a recovery time for the plurality of switching transistors M11 and M12 connected between the first data channel CH1 and the first data line DL1.

Figure 7:
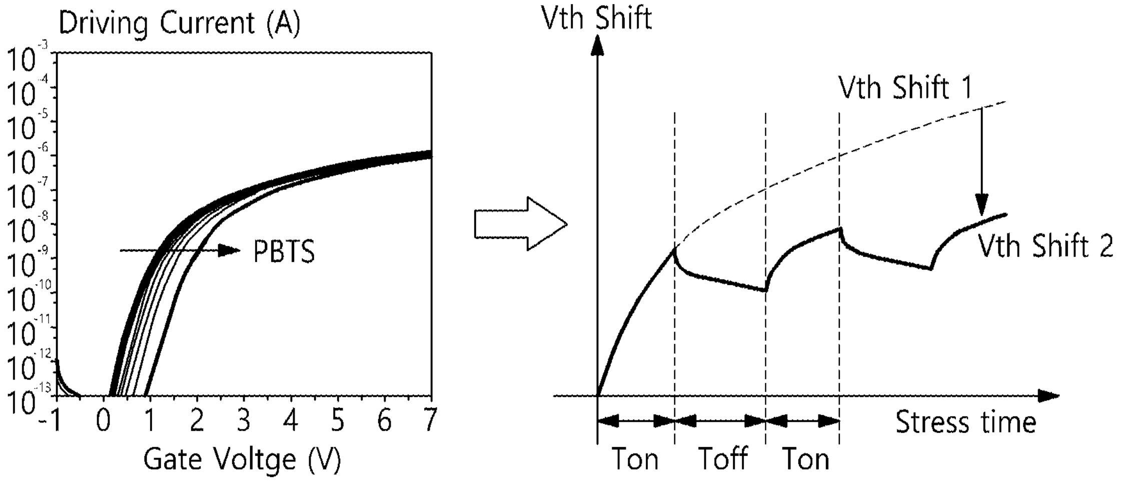
FIG. 7 is a view illustrating an example of a change in bias characteristic of a switching transistor connecting a data channel and a data line in a display device according to example embodiments of the disclosure.

FIG. 7 is a view illustrating an example of a change in bias characteristic of a switching transistor connecting a data channel and a data line in a display device according to example embodiments of the disclosure.

As shown in FIG. 7, in the display device 100 according to embodiments of the disclosure, the multiplexing circuit 112 connecting a data channel and a data line may include a plurality of switching elements formed of transistors.

The switching transistor constituting the multiplexing circuit 112 may deteriorate as the driving time increases, increasing the positive bias temperature stress (PBTS) characteristic in which the threshold voltage shifts in the positive direction.

As such, the positive bias characteristic in which the threshold voltage shifts in the positive direction may further increase when it is formed of an oxide semiconductor having excellent mobility characteristics.

However, the display device 100 of the disclosure may alternately perform the turn-on driving of the turn-on interval Ton and the turn-off driving (recovery driving) of the turn-off interval Toff on the plurality of switching transistors connecting the data channel and the data line, preventing or mitigating the shift of the threshold voltage of the switching transistor in the positive direction.

Further, the display device 100 of the disclosure may maintain the recovery level that is lower than the low level of the turn-on signal during the turn-off interval Toff of the switching transistor constituting the multiplexing circuit 112. As a result, it is possible to enhance the negative bias characteristic in which the threshold voltage of the switching transistor shifts in the negative direction and reduce the positive bias phenomenon in which the threshold voltage shifts in the positive direction.

Therefore, it may be identified that the threshold voltage shift Vth Shift 2 of the switching transistor is alleviated in the display device 100 of the disclosure compared to the shift Vth Shift 1 in the positive direction of the threshold voltage of the switching transistor according to the driving time.

Further, the display device 100 of the disclosure may further enhance the negative bias characteristic by varying the voltage of the recovery level applied during the turn-off interval according to the increase in the driving time, considering that the threshold voltage of the switching transistor shifts in the positive direction according to the driving time.

Figure 8:
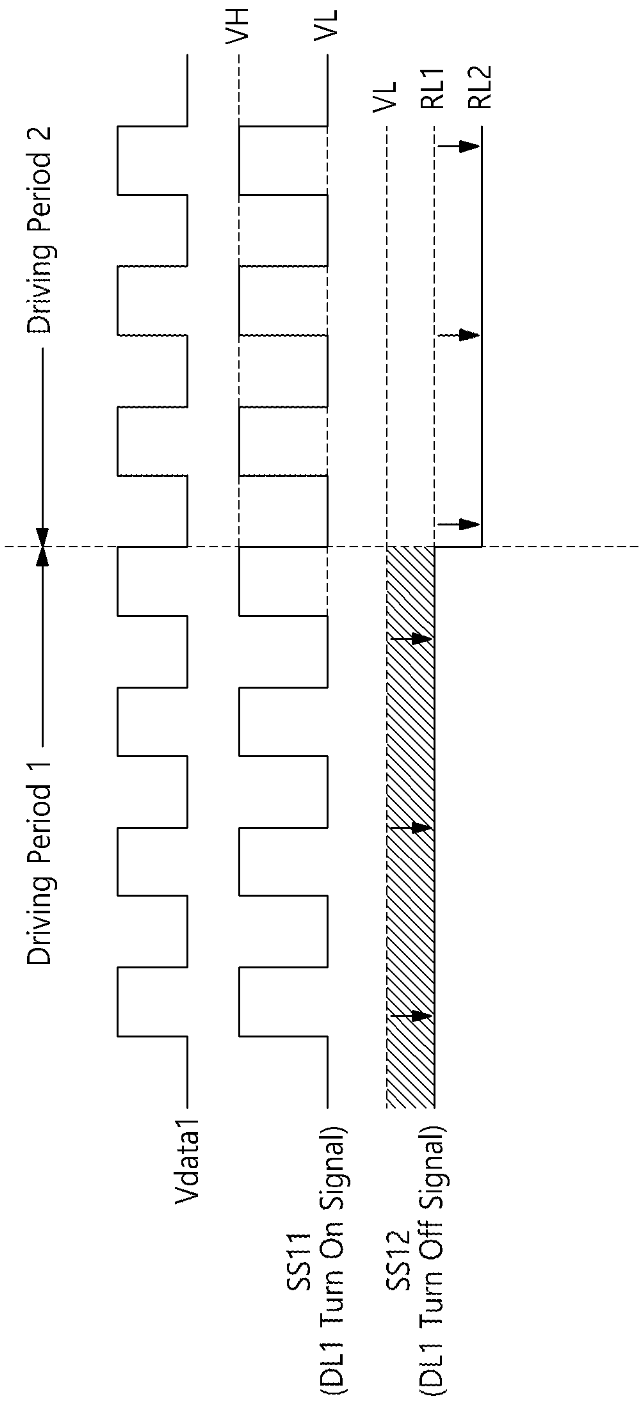
FIG. 8 is a view illustrating an example of a variation in recovery-level voltage applied during a turn-off interval according to a driving period in a display device according to example embodiments of the disclosure.

FIG. 8 is a view illustrating an example of a variation in recovery-level voltage applied during a turn-off interval according to a driving period in a display device according to example embodiments of the disclosure.

As shown in FIG. 8, in the display device 100 according to embodiments of the disclosure, the multiplexing circuit 112 may include an eleventh switching transistor M11 and a twelfth switching transistor M12 connected in parallel between the first data channel CH1 and the first data line DL1.

In this case, when the eleventh switching signal SS11 applied to the eleventh switching transistor M11 is a turn-on signal, the eleventh switching signal SS11 may be a signal applied in synchronization with the first data voltage Vdata1 applied to the first data line DL1.

In other words, the eleventh switching signal SS11 corresponding to the turn-on signal may swing between the high level VL for turning on the eleventh switching transistor M11 and the low level VL for turning off the eleventh switching transistor M11 in synchronization with the first data voltage Vdata1.

In contrast, the twelfth switching signal SS12 applied to the twelfth switching transistor M12 may be a DC voltage maintaining the recovery level RL lower than the low level voltage VL of the turn-on signal to reduce the positive bias characteristic of the twelfth switching transistor M12 and enhance the negative bias characteristic.

In this case, however, as the driving of the twelfth switching transistor M12 continues, the bias characteristic of the twelfth switching transistor M12 may have increased to some extent. Therefore, in order to further increase negative bias characteristics according to the driving time of the twelfth switching transistor M12, the recovery level RL of the twelfth switching signal SS12 applied to the twelfth switching transistor M12 may be adjusted (for example, lowered in a stepwise manner) according to the driving time.

For example, the twelfth switching signal SS12 applied to the twelfth switching transistor M12 may maintain the first recovery level RL1 during the first driving period, and the twelfth switching signal SS12 applied to the twelfth switching transistor M12 may maintain the second recovery level RL2 during the second driving period after the first driving period.

In this case, the second recovery level RL2 may be lower than the first recovery level RL1 so that a negative bias characteristic larger than the first recovery level RL1 may be applied.

As described above, the eleventh switching signal SS11 and the twelfth switching signal SS12 may be alternately applied to the eleventh switching transistor M11 and the twelfth switching transistor M12.

As a result, the display device 100 according to the disclosure may enhance the negative bias characteristics of the plurality of switching transistors M11 and M12 connected between the first data channel CH1 and the first data line DL1 according to the driving time, and enhance data charging characteristics.

Figure 9:
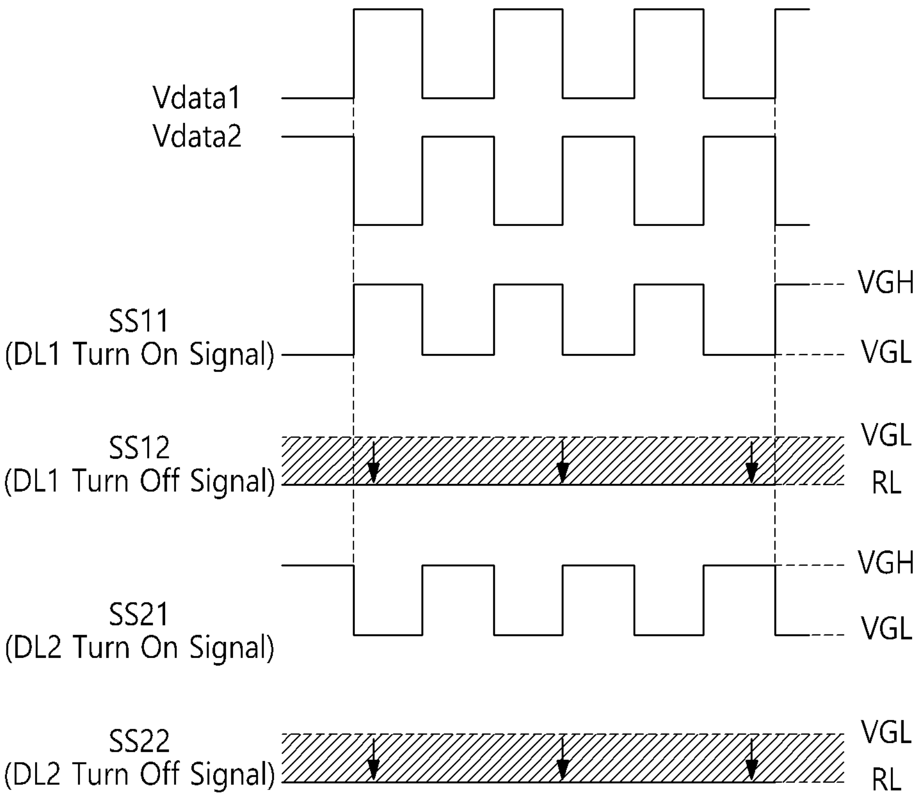
FIG. 9 is a signal waveform diagram illustrating an example of varying the level of a switching signal controlling a multiplexing circuit in a display device according to example embodiments of the disclosure.

FIG. 9 is a signal waveform diagram illustrating an example of varying the level of a switching signal controlling a multiplexing circuit in a display device according to example embodiments of the disclosure.

As shown in FIG. 9, in the display device 100 according to embodiments of the disclosure, the eleventh switching transistor M11 and the twelfth switching transistor M12 connected in parallel to the first data line DL1 may be alternately driven, and the 21st switching transistor M21 and the 22nd switching transistor M22 connected in parallel to the second data line DL2 may be alternately driven.

While the eleventh switching signal SS11 for controlling the eleventh switching transistor M11 connected to the first data line DL1 is applied as the turn-on signal synchronized with the first data voltage Vdata1, the twelfth switching signal SS12 for controlling the twelfth switching transistor M12 may be applied as the turn-off signal of the recovery level RL.

In this case, the eleventh switching signal SS11 synchronized with the first data voltage Vdata1 may be generated using the gate high voltage VGH and the gate low voltage VGL applied to the gate driving circuit 120.

In other words, the switching signal applied to multiplexing circuit 112 may be synchronized with the data voltage using the gate high voltage VGH and the gate low voltage VGL corresponding to the gate signal applied to the display panel 110.

Accordingly, the eleventh switching signal SS11 controlling the eleventh switching transistor M11 may have a waveform of an AC signal that is synchronized with the first data voltage Vdata1 applied to the first data line DL1 and swings between the levels of the gate high voltage VGH and the gate low voltage VGL.

Further, the twelfth switching signal SS12 for turning off the twelfth switching transistor M12 may have a waveform of a DC signal that maintains the recovery level RL.

Likewise, the 21st switching signal SS21 controlling the 21st switching transistor M21 may have a waveform of an AC signal that is synchronized with the second data voltage Vdata2 applied to the second data line DL2 and swings between the levels of the gate high voltage VGH and the gate low voltage VGL.

On the other hand, the 22nd switching signal SS22 for turning off the 22nd switching transistor M22 may have a waveform of a DC signal that maintains the recovery level RL.

Figure 10:
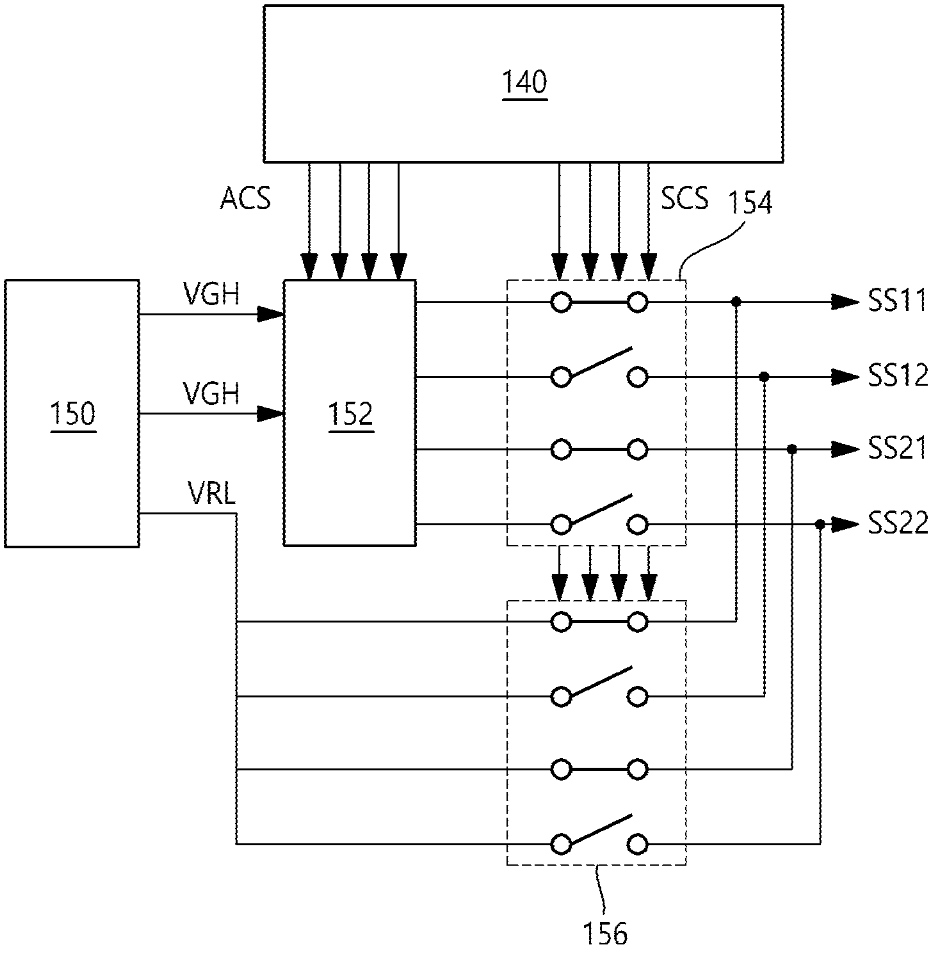
FIG. 10 is a view illustrating an example of a system configuration generating a switching signal for controlling a multiplexing circuit in a display device according to example embodiments of the disclosure.

FIG. 10 is a view illustrating an example of a system configuration generating a switching signal for controlling a multiplexing circuit in a display device according to example embodiments of the disclosure.

As shown in FIG. 10, a display device 100 according to embodiments of the disclosure may include a timing controller 140, a power management circuit 150, a turn-on signal generation circuit 152, a first switch circuit 154, and a second switch circuit 156.

The timing controller 140 may control the operations of the power management circuit 150, the turn-on signal generation circuit 152, the first switch circuit 154, and the second switch circuit 156.

The power management circuit 150 may generate a gate high voltage VGH, a gate low voltage VGL, and a recovery voltage VRL.

The gate high voltage VGH and the gate low voltage VGL may be signals that determine the high level and the low level of the gate signal in the gate driving circuit 120.

The recovery voltage VRL is a voltage having the recovery level RL of the switching transistor constituting the multiplexing circuit 112.

The turn-on signal generation circuit 152 generates an AC turn-on signal that swings between the levels of the gate high voltage VGH and the gate low voltage VGL according to the turn-on control signal ACS of the timing controller 140 and supplies it to the first switch 154.

The first switch circuit 154 may include a plurality of switches respectively connected to the plurality of switching transistors constituting multiplexing circuit 112. Further, the first switch circuit 154 may output the turn-on signal generated by the turn-on signal generation circuit 152 by the switching control signal SCS of the timing controller 140.

In other words, the first switch circuit 154 may determine the turn-on interval of the switching transistor constituting the multiplexing circuit 112 under the control of the timing controller 140.

The second switch circuit 156 may include a plurality of switches respectively connected to the plurality of switching transistors constituting the multiplexing circuit 112. Further, the second switch circuit 156 may output the recovery voltage VRL generated by the power management circuit 150 by the switching control signal SCS of the timing controller 140.

In other words, the second switch circuit 156 may determine the turn-off interval of the switching transistor constituting the multiplexing circuit 112 under the control of the timing controller 140.

Thus, according to the operation of the first switch circuit 154 and the second switch circuit 156, a turn-on signal (signal swinging between high level and low level) applied in the turn-on interval of the switching signals SS11, SS12, SS21, and SS22 and a turn-off signal (DC signal of recovery level) applied in the turn-off interval may be determined.

An example where the turn-on signal generation circuit 152, the first switch circuit 154, and the second switch circuit 156 are positioned outside the power management circuit 150 has been described here, but the turn-on signal generation circuit 152, the first switch circuit 154, and the second switch circuit 156 may be positioned inside the power management circuit 150.

Therefore, the display device 100 of the disclosure may alternately perform the turn-on driving of the turn-on interval Ton and the turn-off driving (recovery driving) of the turn-off interval Toff on the plurality of switching transistors connecting the data channel and the data line in parallel, mitigating the shift of the threshold voltage of the switching transistor in the positive direction.

Further, the display device 100 of the disclosure may maintain the recovery level during the turn-off interval Toff of the switching transistor constituting the multiplexing circuit 112, enhancing the negative bias characteristic of the switching transistor to reduce the positive bias phenomenon in which the threshold voltage shifts in the positive direction and enhance data charging characteristics.

A display device according to various example embodiments of the disclosure may be described as follows.

A display device according to the disclosure may comprise a data driving circuit supplying a data voltage through a plurality of data channels, and a display panel including a plurality of data lines disposed thereon to supply the data voltage to a plurality of subpixels, and including a multiplexing circuit connecting the plurality of data channels and the plurality of data lines. The multiplexing circuit may include a first switching transistor and a second switching transistor connecting a first data channel among the plurality of data channels and a first data line among the plurality of data lines in parallel.

A turn-off interval when a turn-off signal is applied to the second switching transistor may proceed during a turn-on interval when a turn-on signal is applied to the first switching transistor.

The turn-on signal may be a signal synchronized with a first data voltage supplied to the first data channel.

The turn-on signal may be a signal swinging between a high level and a low level.

The turn-off signal may be a direct current (DC) signal having a recovery level for enhancing a negative bias characteristic of the second switching transistor.

The recovery level may be lower than a low level of the turn-on signal.

The first switching transistor and the second switching transistor may have a turn-on interval and a turn-off interval alternately proceeding.

The turn-on interval and the turn-off interval are varied (or alternated) every period of one frame or more.

The recovery level may be maintained at a first recovery level during a first driving period of the display panel, and may be maintained at a second recovery level during a second driving period after the first driving period.

The second recovery level may be lower than the first recovery level.

The high level of the turn-on signal may be a level of a gate high voltage applied to the gate driving circuit, and the low level of the turn-on signal may be a level of a gate low voltage applied to the gate driving circuit.

The display device may further include a power management circuit configured to generate a driving voltage; and a timing controller configured to control the data driving circuit and the power management circuit.

The display device may further include a turn-on signal generation circuit generating a turn-on signal swinging between levels of a gate high voltage and a gate low voltage according to a turn-on control signal of the timing controller, a first switch circuit including a plurality of switches outputting the turn-on signal by a switching control signal of the timing controller, and a second switch circuit including a plurality of switches outputting a turn-off signal by the switching control signal.

The turn-on signal generation circuit, the first switch circuit, and the second switch circuit may be positioned in the power management circuit.

The first switching transistor and the second switching transistor may be formed of an oxide semiconductor material.

A number of the plurality of data channels may be smaller than that of the plurality of data lines.

The multiplexing circuit may further include one or more switching transistors connecting the first data channel and the first data line in parallel with the first switching transistor and the second switching transistor.

The multiplexing circuit may further include a third switching transistor and a fourth switching transistor connecting the first data channel and a second data line in parallel.

The first switching transistor and the second switching transistor may be alternately driven, and the third switching transistor and the fourth switching transistor may be alternately driven. Only one of the first to fourth switching transistors may be turned on at a same time.

A display panel according to example embodiments of the disclosure may comprise a plurality of subpixels, a plurality of data lines supplying a data voltage to the plurality of subpixels, and a multiplexing circuit connecting a plurality of data channels and the plurality of data lines, the multiplexing circuit including a first switching transistor and a second switching transistor connecting a first data channel, among the plurality of data channels, and a first data line, among the plurality of data lines, in parallel.

Further, according to example embodiments of the disclosure, a method for driving a display device comprising a plurality of subpixels, a plurality of data lines supplying a data voltage to the plurality of subpixels, and a multiplexing circuit connecting a plurality of data channels and the plurality of data lines, the multiplexing circuit including a first switching transistor and a second switching transistor connecting a first data channel among the plurality of data channels and a first data line among the plurality of data lines in parallel may be provided. The method may comprise generating a turn-on signal swinging between a high level and a low level according to a turn-on control signal, outputting the turn-on signal by a switching control signal, and outputting a turn-off signal by the switching control signal. While the turn-on signal is applied to the first switching transistor, the turn-off signal may be applied to the second switching transistor.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure.

What is claimed:

1. A display device, comprising:

a data driving circuit configured to supply a data voltage through a plurality of data channels; and a display panel including a plurality of data lines disposed thereon to supply the data voltage to a plurality of subpixels, and including a multiplexing circuit connecting the plurality of data channels and the plurality of data lines, wherein the multiplexing circuit includes a first switching transistor and a second switching transistor connecting a first data channel among the plurality of data channels and a first data line among the plurality of data lines in parallel, wherein a turn-off interval when a turn-off signal is applied to the second switching transistor proceeds during a turn-on interval when a turn-on signal swinging between a high level and a low level is applied to the first switching transistor, wherein the turn-off signal is a direct current (DC) signal having a recovery level of the second switching transistor, and wherein the recovery level is maintained at a first recovery level during a first driving period of the display panel and is maintained at a second recovery level lower than the first recovery level during a second driving period after the first driving period.

2. The display device of claim 1, wherein the turn-on signal is a signal synchronized with a first data voltage supplied to the first data channel.

3. The display device of claim 1, wherein the recovery level is lower than the low level of the turn-on signal.

4. The display device of claim 1, wherein the first switching transistor and the second switching transistor have a turn-on interval and a turn-off interval alternately proceeding.

5. The display device of claim 4, wherein the turn-on interval and the turn-off interval are alternated every period of one frame or more.

6. The display device of claim 1, wherein the high level of the turn-on signal is a level of a gate high voltage applied to the gate driving circuit, and the low level of the turn-on signal is a level of a gate low voltage applied to the gate driving circuit.

7. The display device of claim 1, further comprising:

a power management circuit configured to generate a driving voltage; and a timing controller configured to control the data driving circuit and the power management circuit.

8. The display device of claim 7, further comprising:

a turn-on signal generation circuit configured to generate a turn-on signal swinging between levels of a gate high voltage and a gate low voltage according to a turn-on control signal of the timing controller;

a first switch circuit including a plurality of first switches configured to output the turn-on signal by a switching control signal of the timing controller; and a second switch circuit including a plurality of second switches configured to output a turn-off signal by the switching control signal.

9. The display device of claim 8, wherein the turn-on signal generation circuit, the first switch circuit, and the second switch circuit are positioned in the power management circuit.

10. The display device of claim 1, wherein the first switching transistor and the second switching transistor are formed of an oxide semiconductor material.

11. The display device of claim 1, wherein a number of the plurality of data channels is smaller than a number of the plurality of data lines.

12. The display device of claim 1, wherein the multiplexing circuit further includes one or more other switching transistors connecting the first data channel and the first data line in parallel with the first switching transistor and the second switching transistor.

13. The display device of claim 1, wherein the multiplexing circuit further includes a third switching transistor and a fourth switching transistor connecting the first data channel and a second data line, among the plurality of data lines, in parallel.

14. The display device of claim 13, wherein the first switching transistor and the second switching transistor are configured to be alternately driven, and the third switching transistor and the fourth switching transistor are configured to be alternately driven, and wherein only one of the first to fourth switching transistors is configured to be turned on at a same time.

15. A display panel, comprising:

a plurality of subpixels;

a plurality of data lines configured to supply a data voltage to the plurality of subpixels; and a multiplexing circuit configured to connect a plurality of data channels and the plurality of data lines, the multiplexing circuit including a first switching transistor and a second switching transistor connecting a first data channel, among the plurality of data channels, and a first data line, among the plurality of data lines, in parallel, wherein a turn-off interval when a turn-off signal is applied to the second switching transistor proceeds during a turn-on interval when a turn-on signal swinging between a high level and a low level is applied to the first switching transistor, wherein the turn-off signal is a direct current (DC) signal having a recovery level of the second switching transistor, and wherein the recovery level is maintained at a first recovery level during a first driving period and is maintained at a second recovery level lower than the first recovery level during a second driving period after the first driving period.

16. A method for driving a display device comprising a plurality of subpixels, a plurality of data lines configured to supply a data voltage to the plurality of subpixels, and a multiplexing circuit configured to connect a plurality of data channels and the plurality of data lines, the multiplexing circuit including a first switching transistor and a second switching transistor connecting a first data channel among the plurality of data channels and a first data line among the plurality of data lines in parallel, the method comprising:

generating a turn-on signal swinging between a high level and a low level according to a turn-on control signal;

outputting the turn-on signal by a switching control signal; and outputting a turn-off signal by the switching control signal, wherein, while the turn-on signal is applied to the first switching transistor, the turn-off signal is applied to the second switching transistor, wherein a turn-off interval when a turn-off signal is applied to the second switching transistor proceeds during a turn-on interval when a turn-on signal swinging between a high level and a low level is applied to the first switching transistor, wherein the turn-off signal is a direct current (DC) signal having a recovery level of the second switching transistor, and wherein the recovery level is maintained at a first recovery level during a first driving period and is maintained at a second recovery level lower than the first recovery level during a second driving period after the first driving period.

* * * * *